United States Patent
Haupt

(10) Patent No.: US 8,087,506 B2
(45) Date of Patent: Jan. 3, 2012

(54) MULTIPLE-DISK BRAKE IN AN AUTOMATIC TRANSMISSION HAVING CONTROLLABLE COOLING OIL SUPPLY AND METHOD FOR OPERATING THE SAME

(75) Inventor: Josef Haupt, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 483 days.

(21) Appl. No.: 12/306,974

(22) PCT Filed: Jun. 29, 2007

(86) PCT No.: PCT/EP2007/056537
§ 371 (c)(1),
(2), (4) Date: Dec. 30, 2008

(87) PCT Pub. No.: WO2008/006709
PCT Pub. Date: Jan. 17, 2008

(65) Prior Publication Data
US 2009/0308709 A1 Dec. 17, 2009

(30) Foreign Application Priority Data
Jul. 10, 2006 (DE) .......................... 10 2006 031 787

(51) Int. Cl.
*F16D 13/72* (2006.01)
(52) U.S. Cl. ............. 192/85.61; 192/70.12; 192/113.35; 188/71.6; 188/264 E
(58) Field of Classification Search ............... 192/85.61, 192/113.35
See application file for complete search history.

(56) References Cited

U.S. PATENT DOCUMENTS

| 6,202,814 B1 | 3/2001 | Braford, Jr. |
| 6,907,973 B2 | 6/2005 | Schiele et al. |
| 7,308,977 B2 | 12/2007 | Maguire et al. |
| 2006/0266614 A1 * | 11/2006 | Maguire et al. .......... 192/113.35 |

FOREIGN PATENT DOCUMENTS

| DE | 41 36 040 C1 | 1/1993 |
| DE | 102 30 183 A1 | 1/2004 |
| DE | 10 2006 024 445 A1 | 12/2006 |

* cited by examiner

*Primary Examiner* — Richard M. Lorence
(74) *Attorney, Agent, or Firm* — Davis & Bujold, P.L.L.C.

(57) ABSTRACT

The invention concerns a multi-disk brake (1) in an automatic transmission, with an inner disk carrier (4) and an outer disk carrier (6), with inner disks (3) and outer disks (5) arranged axially in alternation on the disk carriers (4, 6), with friction linings (7) on the inner and/or outer disks (3, 5), with a piston (10) of a pressure-medium-actuated piston-cylinder arrangement such that the inner disks (3) and outer disks (5) can be acted upon by a force to close the multi-disk brake, with an end disk (9) or support disk (11) that forms an axial abutment for the disk set (14) formed by the disks (3, 5, 9, 11), and in which the disk brake (1) and/or the components around it are so configured that the disks (3, 5, 9, 11) can be wetted by a cooling oil. To cool the disk multi-brake (1) even in slip operation phases and in the engaged condition, it is provided that depending on the operating condition of the brake, the cooling oil (13) can be passed over and/or through the disk set (14) in radially different directions. The invention also concerns a method for operating such a disk brake.

24 Claims, 10 Drawing Sheets

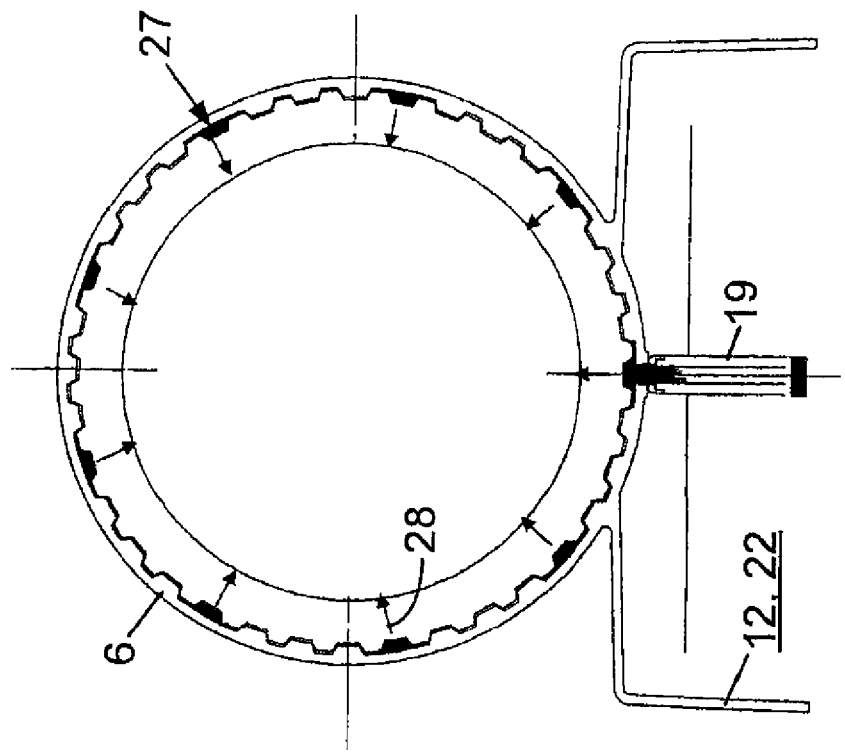
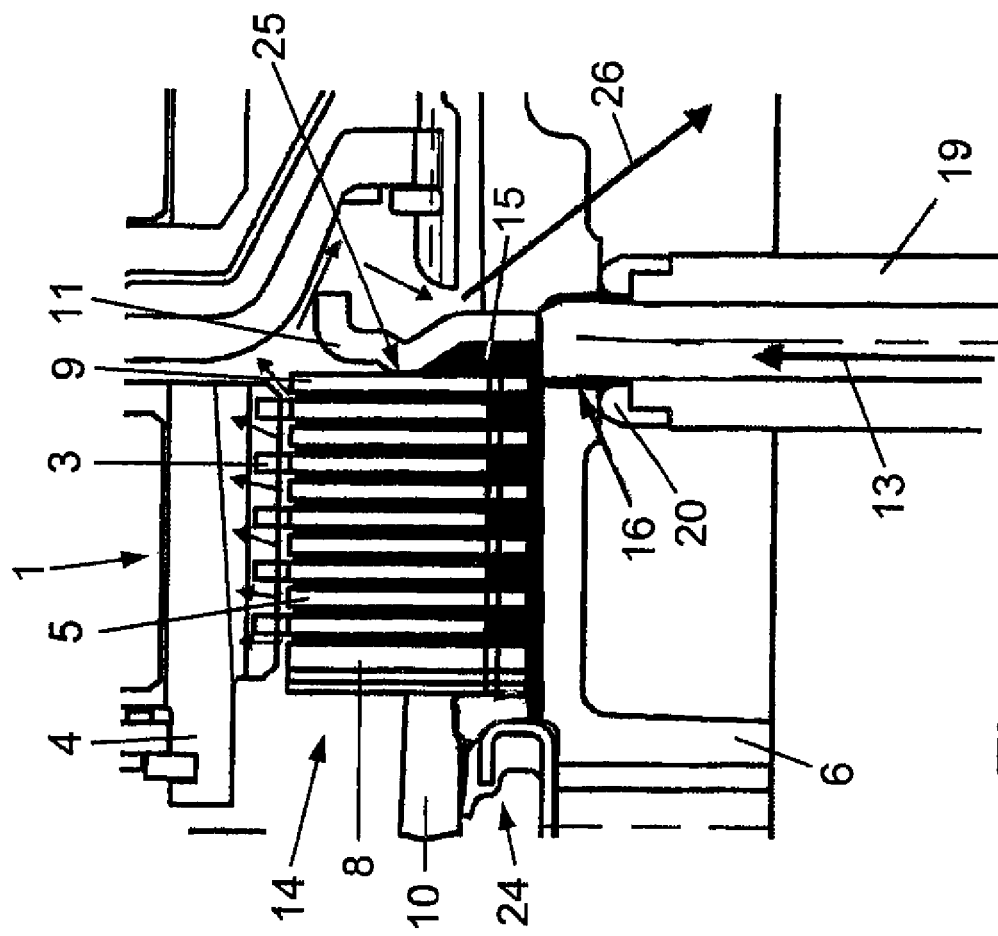

MULTIPLE-DISK BRAKE IN AN AUTOMATIC TRANSMISSION HAVING CONTROLLABLE COOLING OIL SUPPLY AND METHOD FOR OPERATING THE SAME

The invention concerns a multiple-disk brake in an automatic transmission with a controllable cooling oil supply, and a method for its operation.

Such disk brakes are known per se and are used for example as starting or shift elements in automatic transmissions for motor vehicles. Wet-running disk clutches are usually supplied with a cooling oil from radially inside outward, since owing to the rotation movement of the inlet and outlet sides of the clutch this cooling oil is driven radially outward centrifugally, so producing a clearing action for the cooling oil heated in the clutch. In the case of a wet-running multiple-disk brake this radial clearing of the cooling oil is not possible or only so to a very slight extent, since when the brake is closed a rotating brake component is brought to rest against a static brake component with uptake of energy. Such disk brakes are therefore either operated completely immersed in the cooling oil, or selectively supplied with cooling oil from the outside by virtue of a pressure gradient.

In the case of a multiple-disk brake supplied with cooling oil by virtue of a pressure gradient, the cooling oil can pass radially from the inside outward, i.e. in the direction toward the transmission housing. For this, outlet openings can be formed on the outside of the outer disk carrier of the disk brake, through which the cooling oil can flow radially outward within the disk packet and from there out into a cooling oil sump.

A disadvantage of such a structure is that when the disk brake is closed after a phase of slipping-mode operation, heat from the disk brake can still only be dissipated only very ineffectively. Among other things the reason forth is is that the rotatable disks of the multiple-disk brake are no longer rotating, so that under gravity the cooling oil runs down under no pressure onto the radially inner ring area of the disk brake and only wets the narrow, lower segment area of the disks of the disk set. During this, the volume flow in unit time and the heat dissipation by way of the cooling oil through the multiple-disk brake are comparatively small, and the thermal efficiency of such a disk brake is very limited.

Particularly when such a multiple-disk brake in the automatic transmission is operated in a slipping mode in order to carry out additional functions in the case of a known static decoupling or to assist starting in a diesel or Otto engine, the lack of after-cooling causes the thermal behavior of a multiple-disk brake engaged after slipping operation to have a very adverse effect on the operation of the automatic transmission. For example, in a follow-up operation such as re-starting, the starting temperature can be much higher than in the previous starting process and indeed the temperature of the disk brake increases each time restarting takes place.

The insufficient heat dissipation from the disk brake described results in degradation of the cooling oil, which can then no longer carry out its lubricating function to the desired extent in other areas of the automatic transmission. Although such degradation of the cooling and lubricating oil could be avoided by longer time intervals between successive starting processes, this places an unacceptable restriction upon the operation of a motor vehicle.

To ensure that even in the engaged and therefore static condition, the multiple-disk brake has a sufficiently large cooling oil flow for all parts of the disks. In a different technical solution the cooling oil, viewed radially, can be delivered to the disk brake from the outside of the disks under a certain amount of static pressure. For this, however, the disk brakes must be axially sealed so that most of the cooling oil under the said pressure is driven radially through the disk set. The necessary sealing can be provided on one side by the piston of the hydraulic brake actuator associated with the disk brake, which presses against the disk set, such that the latter is supported against the transmission housing. After the end of a phase in which the disk brake has been operating in slipping mode and/or after a subsequent after-cool phase, the cooling oil flow can then be switched off with the disk brake disengaged.

However, in the absence of any additional design measures in such a structure, during operation of the automatic transmission with the multiple-disk brake disengaged, the cooling oil which, in the automatic transmission, is coming from other transmission elements radially farther inside, for example a transmission gearset, a radially inner disk brake and/or a disk clutch, to the disk brake arranged radially farther out in the transmission housing, tends to accumulate because as described, the disk brake is axially sealed. Because of this, a comparatively high drag torque acts on the disks, which can ultimately increase the fuel consumption of a vehicle so equipped to an unacceptable extent and can also reduce its maximum speed.

It is true that the radially inner area of the disk set of the multiple-disk brake could be protected by an oil baffle from too great an oil flow from other transmission elements located radially farther inside the transmission housing, but there is generally no structural space available for this in the transmission housing.

Against this background, a conventional wet-running disk clutch is known from DE 41 36 040 C1, in which cooling oil is supplied to the clutch disks radially from the inside outward. For this purpose, radial openings are formed in an inner disk carrier in the area under the friction lining of the clutch disks, through which the cooling oil can pass thereto in a controlled manner.

In addition, a wet-running disk clutch or disk brake is known from DE 102 30 183 A1, in which, according to a first embodiment, the cooling oil flows through the disk set formed by the clutch disks radially from the inside outward and, according to a second embodiment, radially from the outside inward. In this case, the cooling oil flow is maintained by a defined pressure difference between the cooling oil entry point into the disk set and the point of its emergence therefrom. To control the flow of cooling oil, the clutch or brake disk space is sealed by supporting the last, outermost disks against the transmission housing and, in the actuated condition, by the pistons in contact with the disks at the other end, via metal-to-metal contact of the components, or by way of separate elastomer seals.

Finally, U.S. Pat. No. 6,202,814 B1 discloses a multiple-disk brake in an automatic transmission in which a cooling oil can be supplied to the disks from the outside via an annular channel formed radially above the disk set; the cooling oil delivery being controlled by a separate valve.

The purpose of the present invention is to further develop a wet-running, multiple-disk brake in an automatic transmission, in such a manner that it can be supplied with a cooling oil more effectively than hitherto. In particular, having regard to the existing structural space limitations, the means for delivering cooling oil to the disk brake should be capable, during slipping operation or with the disk brake engaged, of carrying away heat to the desired extent in a cooling oil flow and when the disk brake is disengaged, of minimizing the drag torque losses. A further objective is to indicate a method for operating such a multiple-disk brake.

These objectives are achieved by the characteristics specified in the two independent claims, while advantageous design features or further developments of the invention are defined in the associated subordinate claims.

The invention is based on the realization that the technical problem outlined above can be solved if, depending on the operating status of the multiple-disk brake, the cooling oil is passed through it radially from the outside inward or radially from the inside outward. When the disk brake is disengaged, the cooling oil in the transmission housing passes through and/or over it radially from the inside outward and then drains into the cooling oil sump, whereas in slipping operation or when the disk brake is engaged, the cooling oil coming radially from the outside passes radially inward through the disk brake. The space around the disk brake is preferably substantially sealed against axial escape of the cooling oil so as to favor the direction of flow. The flow direction of the cooling oil is reversed by suitable means which open or close a radial opening in the outer disk carrier of the disk clutch, depending on the operating situation.

Thus, the invention concerns a multiple-disk brake in an automatic transmission, with an inner disk carrier and an outer disk carrier, with inner disks and outer disks arranged in axial alternation on the disk carriers; with friction linings on the inner and/or outer disks; with a piston of a pressure-medium-actuated piston cylinder arrangement by way of which the inner disks and the outer disks can be acted upon by a force that engages the disk brake and with an end disk or supporting disk remote from the piston that forms an axial abutment for the disk set constituted by the disks. The disk brake and/or the components around it are formed such that the disks can be wetted by a cooling oil. According to the invention, it is also provided that the disk brake is formed in such a manner as to enable the cooling oil to be passed over and/or through the disk set in radially different directions, depending on the operating condition of the disk brake.

The operating-situation-dependent, respectively different cooling oil flow direction through and/or over the disks of the disk brake advantageously enables, in the disengaged condition, a large, drag-torque-avoiding drainage of the cooling oil flowing away from other transmission components in the direction toward the disk brake and when the disk brake is operating in the slipping mode or is engaged, a cooling oil inflow under static pressure radially from outside inward through the disk brake so that, in this operating condition, heat can be dissipated from it sufficiently well without or with only little dynamic delivery of the cooling oil in the area of the disk brake. It is regarded as particularly advantageous that the disk brake be actively supplied with cooling oil in an after-cooling phase even when the rotatable disks are at rest.

According to a first embodiment of the invention, it is provided that an end disk on the piston side is arranged on one of the two disk carriers, between the piston of the piston-cylinder arrangement and the inner or outer disk adjacent to the piston.

A further development of the disk brake provides that, in the axial direction, it is substantially sealed against escape of the cooling oil. This measure favors the guiding of the cooling oil flow radially through the disk brake, above all when the brake is engaged or operating in the slipping mode, since axial escape of the cooling oil is largely avoided and the oil is therefore available for cooling purposes.

Another design variation provides that the disk brake is axially sealed by separate sealing mechanisms on the piston, the end disk on the piston side, the inner or outer disk adjacent to the piston, the end disk remote from the piston and/or a support disk remote from the piston. However, the disk brake can also be axially sealed by seal-forming metallic surfaces on the piston, the end disk on the piston side and/or the inner or outer disk adjacent to the piston and/or the end disk remote from the piston and/or the support disk remote from the piston.

As regards the guiding of the cooling oil, according to another feature in the area of the disk set one or more radial openings, the outer disk carrier has, through which the cooling oil can flow to or from the disk set.

The at least one radial opening in the outer disk carrier preferably opens into an annular space formed at least at one axial end of the disk set between the piston and the end disk on the piston side and/or between the end disk and the support disk. From there, the cooling oil flows to the brake disks, which have at least partially radial grooves in the friction lining of each inner and/or outer disk, through which the cooling oil can flow from the inflow-side radial end to the outflow-side radial end of the disks of the disk set. The at least one groove in the friction lining is radially straight or radially curved, where different flow characteristics and dwell times of the cooling oil in the disk set can be produced.

To further assist the flow through the disk set, the inner disk carrier has radial openings for the inflow or outflow of cooling oil from or into the disk set. In addition, in a known manner, it is provided that to pass the cooling oil on from the annular space to the disks, a carrier serration on the outer disk has sections in which at least one tooth is missing or there is a tooth gap in the carrier profile. Through this gap, the cooling oil can first run a certain distance in the area of the outer disk carrier within the disk brake axially relative to the brake disks, concerning which more will be said later.

To optimize the cooling action of the cooling oil on the multiple-disk brake, it is provided that when the disk brake is disengaged, the cooling oil can pass through it radially from the inside outward. The terms "radially inside" and "radially outside" relate here to the axial middle of the automatic transmission in whose area close to the housing the disk brake is preferably arranged. The outer disk carrier is then connected in a rotationally fixed manner to the transmission housing or is even an integral part of it.

Another further development of the invention provides that in the disengaged condition of the disk brake, the cooling oil can be delivered to it from other transmission components. These may be the gear wheels of a first and/or second gearset and/or a disk brake or disk clutch of the automatic transmission arranged radially farther inside the latter.

A further important embodiment feature of a multiple-disk brake made provides that when the disk brake is engaged or operating in a slipping mode, the cooling oil can pass through it radially from the outside inward. This takes place under a static pressure and not a dynamic pressure, since when the disk brake is engaged no rotation of the rotatable brake disks that can produce a dynamic cooling oil pressure at the disk brake takes place.

In this operating situation, the cooling oil is delivered through separate oil delivery means, which can consist of a valve or a component that can be brought radially close to the disk brake. According to another variation, the oil delivery means consist of a rotary valve arrangement in which a controllable rotating component blocks or opens at least one oil passage opening to block or allow the passage of cooling oil.

In the former case, the oil delivery means for passing on the cooling oil can be brought up to the radially outer end of the opening in the outer disk carrier to form an annular seal and, after the end of the operating mode, it can be moved radially away from the outer disk carrier to free the opening.

In a concrete mechanically engineered embodiment, the oil delivery means consist of a radially displaceable delivery tube which can be moved radially by a control pressure that engages the disk brake or brings it into slipping operating. The same control pressure is also applied to the piston of the piston-cylinder arrangement in the automatic transmission which actuates the disk brake, by an associated electro-hydraulic control unit.

In this connection, it can be provided that facing radially toward the outer disk carrier at its end, the delivery tube has a seal or that a seal which surrounds the opening is arranged radially on the outside of the outer disk carrier. This seal can be an O-ring held in an associated annular groove.

The oil delivery means, made as a delivery tube or as a hydraulic switching valve, is preferably integrated in the electro-hydraulic, control unit for the automatic transmission or arranged on it.

The switching valve can have a separate housing in which a spring-loaded piston is arranged to axially move so that the piston can open or block a transfer bore for the cooling oil to the radial opening in the outer disk carrier. The cooling oil enters the switching valve through an inlet bore in the housing of the valve.

In addition, the switching valve preferably has an outlet bore through which cooling oil can drain out of the valve housing, for example when the disk brake is operated in the open condition, and via which cooling oil can pass toward a cooling oil sump.

The housing of the switching valve can be made integrally with the transmission housing or integrally with the housing of the hydraulic control unit or it can be separate therefrom.

An advantageous way to produce a switching valve housing, integrated in the transmission housing, is to orientate its control valve axis transversely to the main axis of the transmission, i.e., arranged transversely to the longitudinal axis of the transmission housing. If the switching valve housing is made as a separate housing, an arrangement thereof in the transmission is preferred in which the control valve axis is directed parallel to the main axis of the transmission. It can also be provided that the control valve axis is directed obliquely to the main axis of the transmission, i.e., at an angle different from 90°.

Relating to the switching valve housing, another feature is that to enable venting of the spring space, which accommodates the valve spring, the housing has an axial vent hole in its end face close to the spring or a radial vent slit, in the latter case made separately or formed as an elongated drain hole for the cooling oil in the switching valve housing.

To assist the guiding of cooling oil axially around the disk brake when the latter is disengaged, a further design embodiment of the invention provides that, in the area of the support disk remote from the piston, a drain channel or drain hole for the cooling oil is made in or on a component of the automatic transmission fixed on the housing.

However, in a further development, to divert the cooling oil flow radially over and/or through the brake disk set, the switching valve can also be made such that it can be switched by a separate control pressure. This directly or indirectly depends on the control pressure by way of which the piston of the brake disk actuator is moved to engage the disk brake.

In its actual structure, such a switching valve comprises a valve housing with a control pressure bore for admitting the control pressure; a control pressure chamber to hold the control pressure medium; an inlet bore for the cooling oil; an outlet bore for the cooling oil, and a transfer bore for the cooling oil. In addition, a first piston that opens or closes the transfer bore that is in flow connection with the opening in the outer disk carrier and a second, control piston that can be acted upon by the control pressure medium are provided. These two pistons are axially connected to one another by a piston rod and acted upon with an axial force by a spring.

Another further development of the invention provides a hydraulic switching valve comprising a hollow cylindrical housing fixed radially under the radial opening in the outer disk carrier in such a manner that the inner casing surface of the housing embraces the opening in the outer disk carrier in which a piston, preferably pot-shaped in longitudinal section and with a hole at the bottom, is held in the housing and can move axially, and in which lateral openings are made in the housing. These openings are opened or closed by the sidewalls of the piston, depending on its position. The piston in this control valve can also be made as an engaged cylinder.

Preferably, the housing of this hydraulic switching valve is set at one of its axial ends into a radial recess in the transmission housing and/or in the outside of the outer disk carrier and, at its other end, arranged on the housing of the hydraulic transmission control unit.

Furthermore, it is advantageous for at least one sealing element to be arranged between the housing of the hydraulic switching valve and the housing of the hydraulic transmission control unit in order to seal the cylinder space. This structural measure ensures optimum passing on of the cooling oil without leakage and enables equalization of the clearances when the control valve is fitted between the transmission housing and the control unit.

In particular, the hydraulic switching valve is configured such that when cooling oil enters the cylinder space radially from the outside inward, the piston can be moved in the direction toward the outer disk carrier to a closing position in the housing, and when cooling oil enters the cylinder space radially from the inside outward, the piston can move in the opposite direction so that it frees the lateral openings in the housing of the switching valve.

Preferably, in this case, it is provided that the movement of the piston, which frees the lateral openings in the housing, is brought about by an inflow of cooling oil to the piston radially from the inside outward and/or by the restoring force of a spring. The latter is supported at one end on the piston or the bottom of the piston pot and at the other end on the radially outer side of the outer disk carrier or the transmission housing.

As regards the opposite direction, it is provided that the movement of the piston, which closes the lateral openings in the housing of the switching valve, is brought about by an inflow of cooling oil radially from the outside inward into the cylinder space of the housing under the bottom of the piston.

As was mentioned at the start, the invention also concerns a method for operating a disk brake. This method provides that, depending on the operating status of the multiple-disk brake, the cooling oil passes through and/or over its disk set in radially different directions.

As already described earlier, the different cooling oil movement through and/or over the disks of the disk brake, depending on the operating status of the latter advantageously enables, on the one hand when the brake is disengaged, an outflow of excess cooling oil in the area of the disk brake, flowing toward the disk brake from other components of the transmission, which avoids a high drag torque. In contrast, when the disk brake is engaged or operating in a slipping mode the cooling oil flows actively, under static pressure, radially from the outside inward through the disk set so as to enable sufficient dissipation of heat from the disk brake in this operating condition without or with only little dynamic delivery of cooling oil in the area of the disk brake. It is regarded as particularly advantageous that this disk brake can still be actively supplied with cooling oil during an after-cooling phase even when the rotatable disks are at rest.

Accordingly, the method is designed so that when the disk brake is engaged or slipping, the cooling oil passes through the disk set radially from the outside inward and, when the disk brake is disengaged, the oil passes through and/or over the disk set radially from the inside outward.

The flow direction of the cooling oil through and/or over the disk set of the disk brake is determined by actuating an oil delivery means which is activated by a hydraulic pressure difference. This pressure difference that actuates the oil delivery means can be produced by a differential pressure produced in the coiling oil stream or it may be a static hydraulic pressure of a pressure medium by way of which the piston of the brake disk actuator is also actuated. The pressure for actuating the oil delivery means depends, indirectly at least, on the level of the actuating pressure of the brake disk actuator. Preferably, the oil delivery means is actuated by a hydraulic pressure by which the piston of the brake actuator is moved in the engaging direction.

According to a special embodiment of the invention, in this connection it can be provided that the oil delivery means is actuated by a mechanically deflected movement of the disk brake actuating piston. For this purpose, the piston is connected directly or indirectly with the oil delivery means or an associated valve via at least one other component.

The pressure of the cooling oil and hence the cooling oil flow can also be adjusted as a function of the current thermal loss performance of the disk brake. This loss performance is calculated from the speed of the rotatable brake component and the piston pressure of the brake piston.

Another embodiment of the method provides that the oil delivery means is actuated by a hydraulic pressure produced in the already mentioned hydraulic control unit for the brake disk actuator and/or the electro-hydraulic transmission control unit, independently of the actuating pressure for the piston of the disk brake.

In a final embodiment, it can be provided that an oil delivery means, formed as an electromagnetic switching valve, is actuated by an electric control pulse from a control unit so enabling the cooling oil to flow in through the disk set of the disk brake radially from the outside inward or to flow out radially from the inside outward.

To clarify the invention, the description of a drawing with example embodiments is attached. The drawing shows:

FIG. 2 is a disk brake, according to FIG. 1 shown in enlarged section, in slipping operation or in the engaged condition with cooling oil flowing through radially from the outside inward;

FIG. 3 is a cross-section through the outer disk carrier of the disk brake in the area of the drive teeth;

Figure 1:
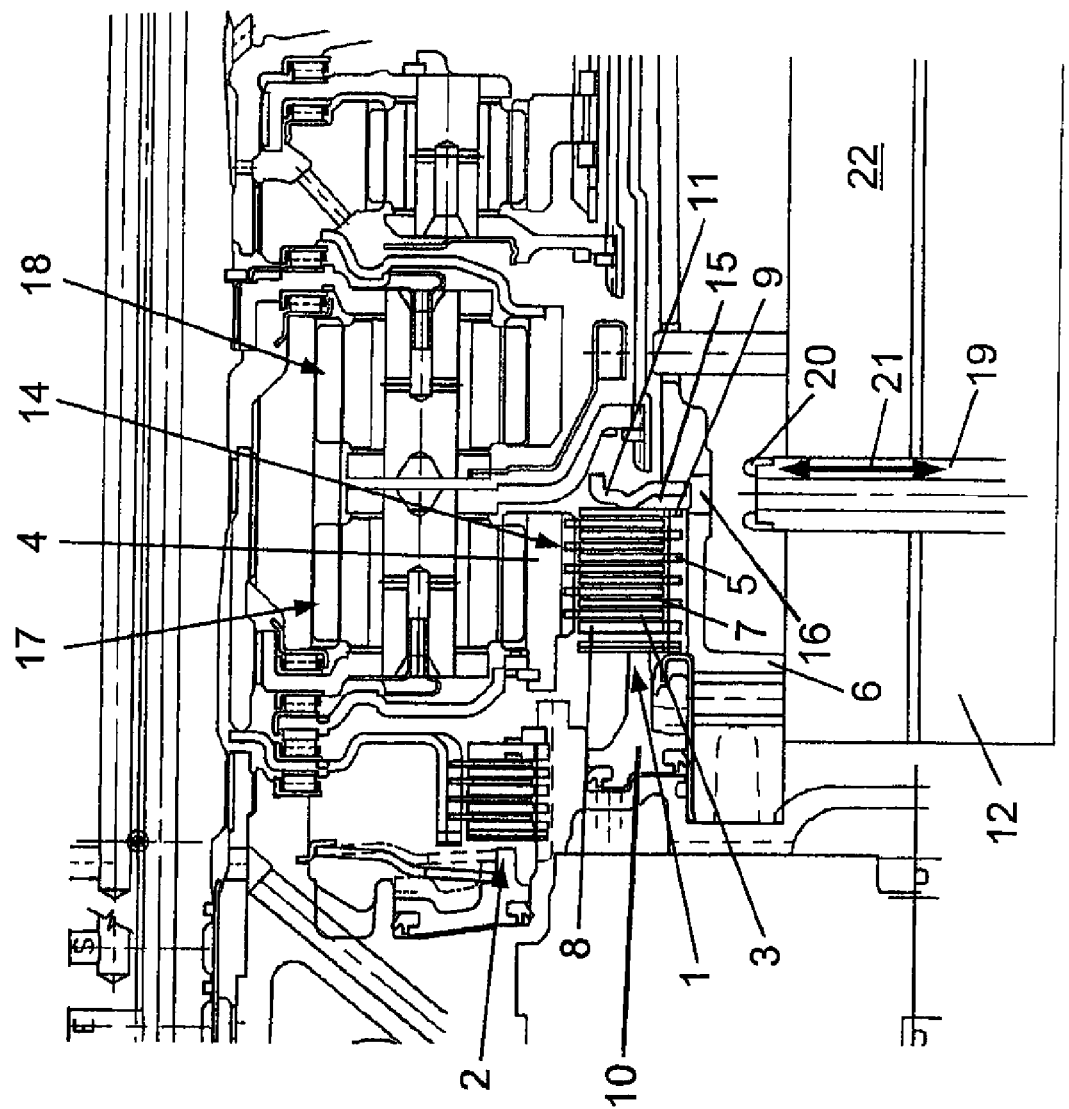
FIG. 1 is a schematic longitudinal section through an automatic transmission with a multiple-disk brake according to the invention, with radially alternative cooling oil flow through a cooling oil delivery means that can be extended radially.

Accordingly, FIG. 1 shows a multiple-disk brake 1 according to a first embodiment of the invention. This disk brake is made as a shift element of an automatic transmission shown in section and comprises first, in a known manner, an inner disk carrier 4 carrying inner disks 3, which is connected to a rotary component of the automatic transmission. In addition, the multi-disk brake 1 comprises an outer disk carrier 6 carrying outer disks 5, which is connected in a fixed manner to a housing 12 of the automatic transmission. The inner disks 3 and the outer disks 5 are arranged axially in alternation with one another and, together with two end disks 8 and 9 and a support disk 11, form a disk set 14. One end disk 8 can be acted upon axially by a piston 10 of a pressure-medium-actuated, piston-cylinder arrangement with an actuating force which engages the multi-disk brake 1. The opposite support disk 11 is connected in a fixed manner to the outer disk carrier 6 and forms an axial abutment for the disk set 14 as a whole.

In the present case, the inner disks 3 are fitted on both sides with a friction lining 7, while the outer disks 5 have no friction lining. Also without any friction lining are the end disk 8 on the piston side and the support disk 11.

In a different design, the inner disks 3 and the outer disks 5 both have friction linings 7. In each case, these linings are arranged facing in the same axial direction.

It can also be seen that in the same cross-sectional plane of the automatic transmission in which the multi-disk brake 1 is arranged, there is radially on the inside a first gearset 17 and to the right and next to it, a second gearset 18 of the automatic transmission. Axially to the left of the first gearset 17 and the multi-disk brake 1, a conventional disk brake 2 is arranged.

The multi-disk brake 1, shown in FIG. 1 is in the open, rest condition when the automatic transmission is not in operation. To cool the multi-disk brake 1 with a cooling or lubricating oil, when the automatic transmission is operating, two radially opposite flow directions in it are used. If the multi-disk brake 1 is operated in a slipping mode or is engaged, the cooling oil flows radially from the outside inward, i.e., toward the longitudinal axis of the transmission. In contrast, when the multi-disk brake 1 is disengaged, the cooling oil flows radially from the inside outward. During this movement, radially from the inside outward, the cooling oil is acted upon by gravity and a dynamic pressure imposed upon it by the rotating transmission components, whereas the cooling oil movement radially from the outside inward is brought about by a static cooling oil pressure with a radially inward pressure gradient.

The multi-disk brake 1 is largely axially sealed against an escape of cooling oil. This will be discussed in more detail later on. Furthermore, on the multi-disk brake 1, shown in FIG. 1, are arranged separate cooling oil delivery means in the form of a radially movable delivery tube 19, whose mobility is indicated by an arrow 21. The delivery tube 19 can be integrated in a hydraulic control unit 22, but can also be held in a separate housing or, radially movably, in the transmission housing 12.

As shown in FIG. 1 taken together with FIG. 2, when cooling oil 13 under a static pressure is passed to the delivery tube 19, the latter moves from its rest position (shown in FIG. 1) radially toward the outer disk carrier 6 until, as shown in FIG. 2, it comes with a seal 20 arranged at its end close to the inner disk carrier, into contact with the radially outer side of the outer disk carrier 6. When the multi-disk brake 1 is in slipping operation or engaged, the cooling oil 13 then passes radially from the outside inward through the multi-disk brake 1.

For this the cooling oil 13, represented in FIG. 2 and other Figures by the black area, first flows from a pressure source through a central bore of the delivery tube 19 past the seal 20, through an opening 16 in the outer disk carrier 6 and into an annular space 15 which, in the example embodiment shown in FIG. 2, is formed between the side of the support disk 11 facing the piston and the side of the end disk 9 remote from the piston. The end disk 9 is in axially sealing contact with the support disk 11, either by way of a separate seal element or, without any such, by simple metal-to-metal contact. Axially on the opposite side the disk set 14 is substantially sealed against the axial escape of cooling oil by a separate seal 24 and/or due to the pressure of the piston 10 against the end disk 8 adjacent to the piston.

The end disk 8 can be made either as a flat disk or as a spring disk (corrugated spring). If the end disk is made as a spring disk, it is designed in relation to its rigidity, such that when the disk brake is operating with slippage or is engaged, it is pressed flat or nearly so. However, a structure is also possible in which there is no end disk 8 so that the piston 10 presses directly against the last outer disk 5 next to it.

Because of the axial sealing of the disk set 14 of the multi-disk brake 1, the cooling oil 13 coming in from outside can only pass axially into the disk set 14 through tooth gaps 27 at the circumference of the outer disk carrier 6 and then, through radial grooves in the friction linings 7 of the inner disks 3 and/or the outer disks 5 (not specifically illustrated here), can flow through the disk set 14 radially inward toward the inner disk carrier 4, where it leaves the disks 3, 5, via radial bores in the inner disk carrier 4. This is represented by the short arrows 28 in FIG. 3 among others.

From the inner disk carrier 4 the cooling oil 13, heated in the multi-disk brake 1 during slipping operation or in an after-cool process of the engaged disk brake 1, flows past the disk set 14 under the effect of gravity, with a separate cooling oil flow 26 toward a cooling oil sump, from which the cooling oil 13 can then be drawn again by a pump and via a cooler to be returned to the delivery tube 19 or the disk set 14.

Figure 4:
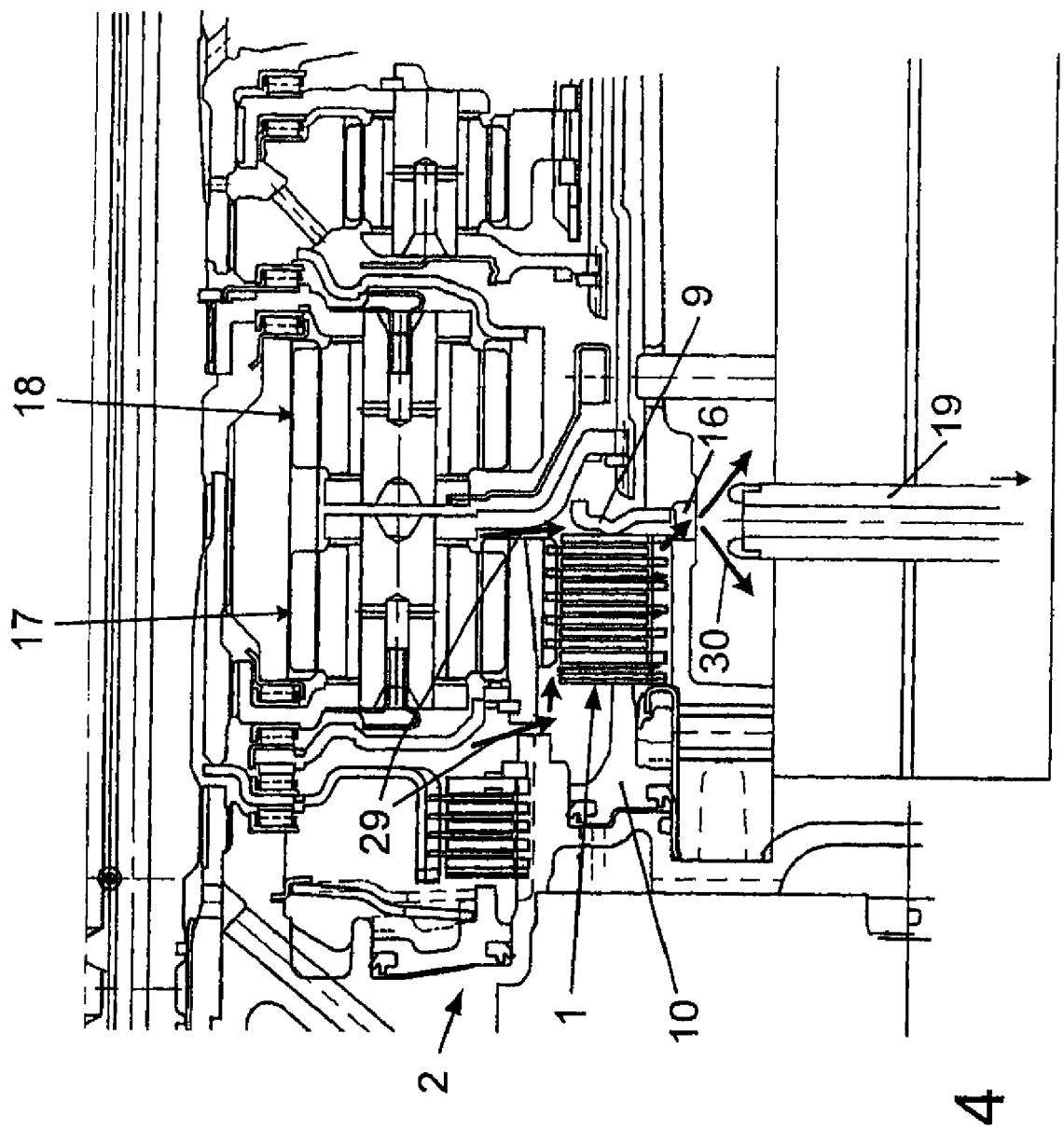
FIG. 4 is a disk brake of FIG. 1 in the disengaged condition with cooling oil flowing through radially from the inside outward.

FIG. 4 illustrates an operating mode of the automatic transmission in which the multiple-disk brake 1 is disengaged and the delivery tube 19 has been retracted radially to its rest position. In this situation, cooling oil 29 passes from the conventionally cooled disk brake 2 and the gear wheels of the two gearsets 17 and 18 arranged radially inside the transmission housing 12, by spray action and the effect of gravity, to the multi-disk brake 1. Since as explained above, the disk set 14 is axially substantially sealed in this operating situation, the cooling oil flows radially from the inside outward through the radial grooves of the friction linings 7 of the inner disks 3 and/or the outer disks 5 of the disengaged multi-disk brake 1. During this, the cooling oil 13 passes through the annular space 16 in this case at the end of the disk set 14 remote from the piston, from where it can flow in through the radial opening 16 through outer disk carrier 6. In this situation, since the delivery tube 19 is in its rest position away from the outer disk carrier 6, this cooling oil flows down in oil streams 30 to the cooling oil sump. A smaller volume flow of the cooling oil passes the support disk 11 on its side facing away from the piston, and from there into the cooling oil sump. This is also shown in FIG. 5.

Figure 5:
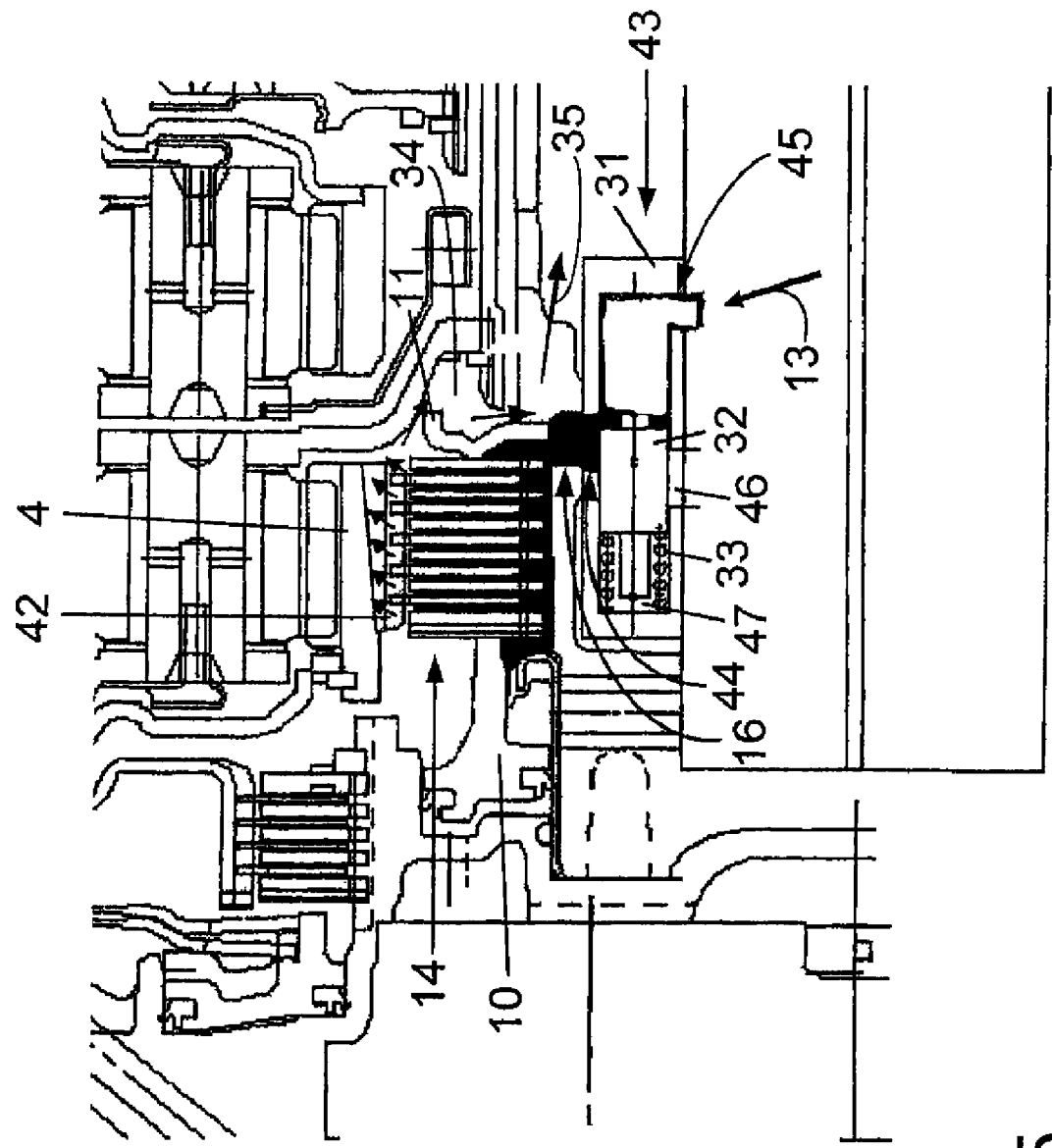
FIG. 5 is a disk brake with a control valve as the cooling oil delivery means in slipping operation or in the engaged condition with cooling oil flowing through radially from the outside inward.

In FIG. 5 the oil delivery device on the multi-disk brake 1 is made as a hydraulic switching valve 43. Depending on how it is actuated or on the current operating status of the multi-disk brake 1 and the automatic transmission, this enables the cooling oil to flow through the disk set 14 or around it in the opposite radial direction.

The switching valve 43, shown in FIG. 5, has a valve housing 31 in whose inside space a piston 32 is fitted and can move axially. At one end the piston 32 is acted upon by the force of a spring 33, while its axially opposite end is in contact with the cooling oil. To cool the multi-disk brake 1 during slipping operation or when it is engaged, cooling oil 13 is delivered to the switching valve 43 under a sufficiently high static pressure through an inlet bore 45 in the valve housing 31 so that the piston 32 of the switching valve 43 in FIG. 5 is pushed to the left against the restoring force of the spring 33 and thereby opens a transfer bore 44 in the valve housing 31. This transfer bore 44 is in flow connection with the already mentioned opening 16 in the outer disk carrier 6 so that, through the latter, the diverted cooling oil 13 passes into the annular space 15 on the disk set 14.

From there it flows, while being heated up, radially from the inside outward through the disk set 14. After leaving the radial openings 42 in the inner disk carrier 4, the cooling oil flows past the support disk 11 in the transmission housing and into a nearby return space 34, and from there, in an oil stream 35, radially from the inside outward to the cooling oil sump.

Figure 6:
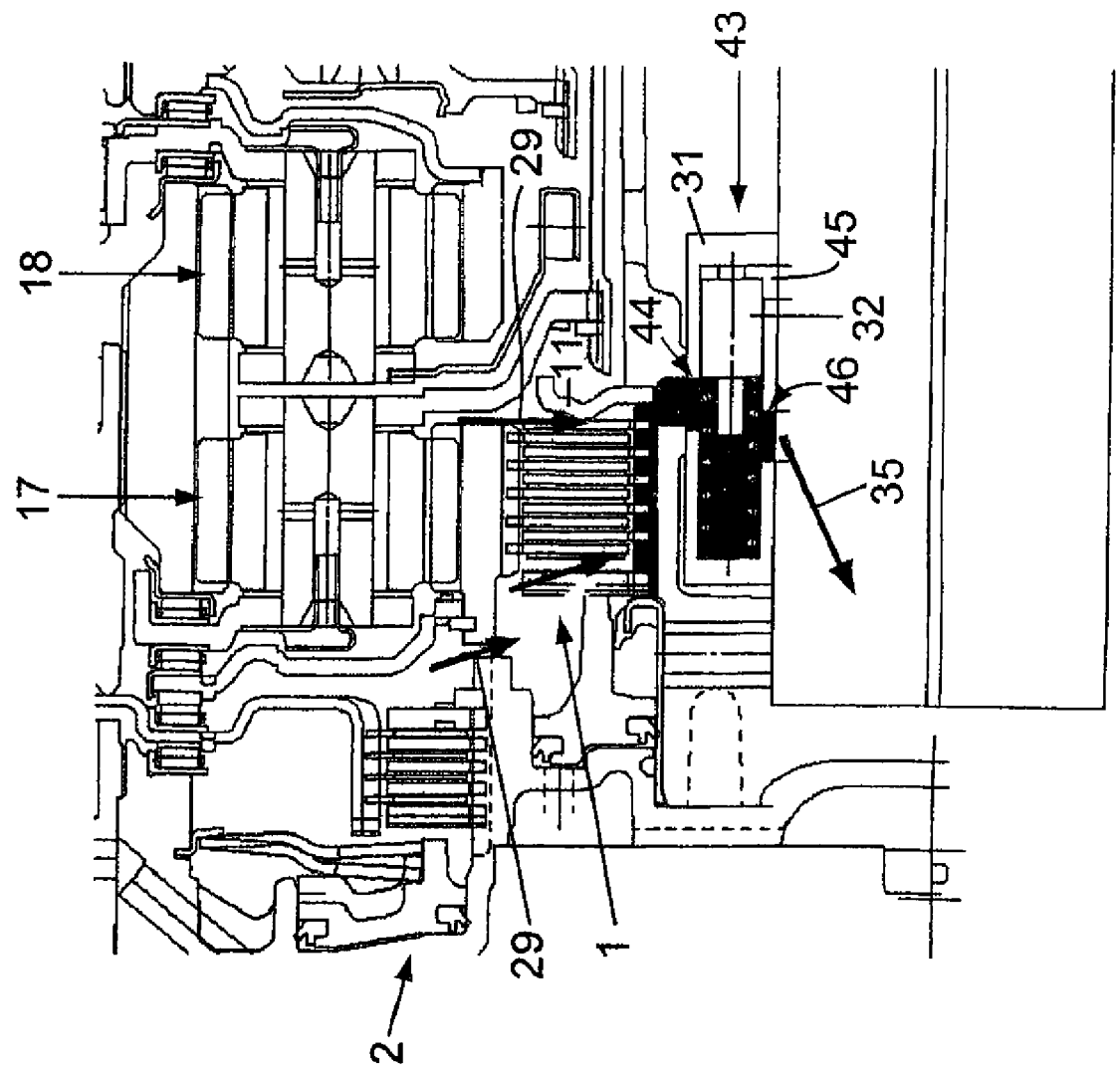
FIG. 6 is a disk brake of FIG. 5 in the disengaged condition with cooling oil flowing through radially from the inside outward.

FIG. 6 shows the operating situation in which the multi-disk brake 1 is open and the cooling oil is flowing in oil streams 29 from the conventional disk brake 2 and from the two gearsets 17 and 18 in the transmission housing, radially from the inside outward in the direction toward the multi-disk brake 1 according to the invention. In this situation, no cooling oil is delivered to the inlet bore 45 of the switching valve 43 so that the valve piston 32 is pushed to the right in the Figure by the force of the spring 33. This opens up the transfer bore 44 and the outlet bore 46 in the valve housing 31 so that the cooling oil can flow away through the disk set 14 of the multi-disk brake 1, the transfer bore 44 and the outlet bore 46 through the switching valve 43, and in a cooling oil stream 35 to the cooling oil sump.

Figure 7:
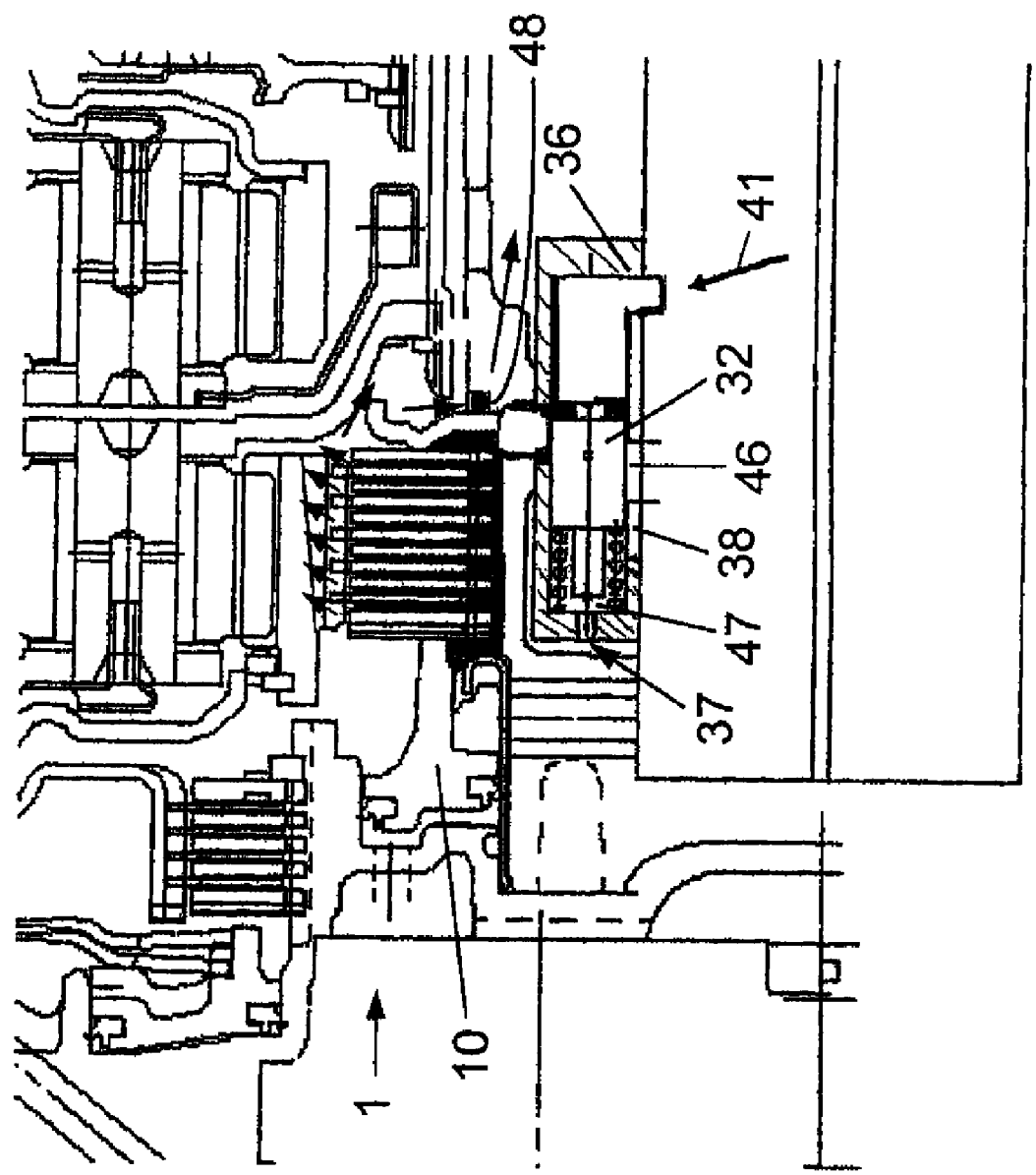
FIG. 7 is a disk brake of FIG. 5 in slipping operation or in the engaged condition, with cooling oil flowing through radially from the outside inward and draining of the cooling oil axially and radially past the disk brake.
Figure 8:
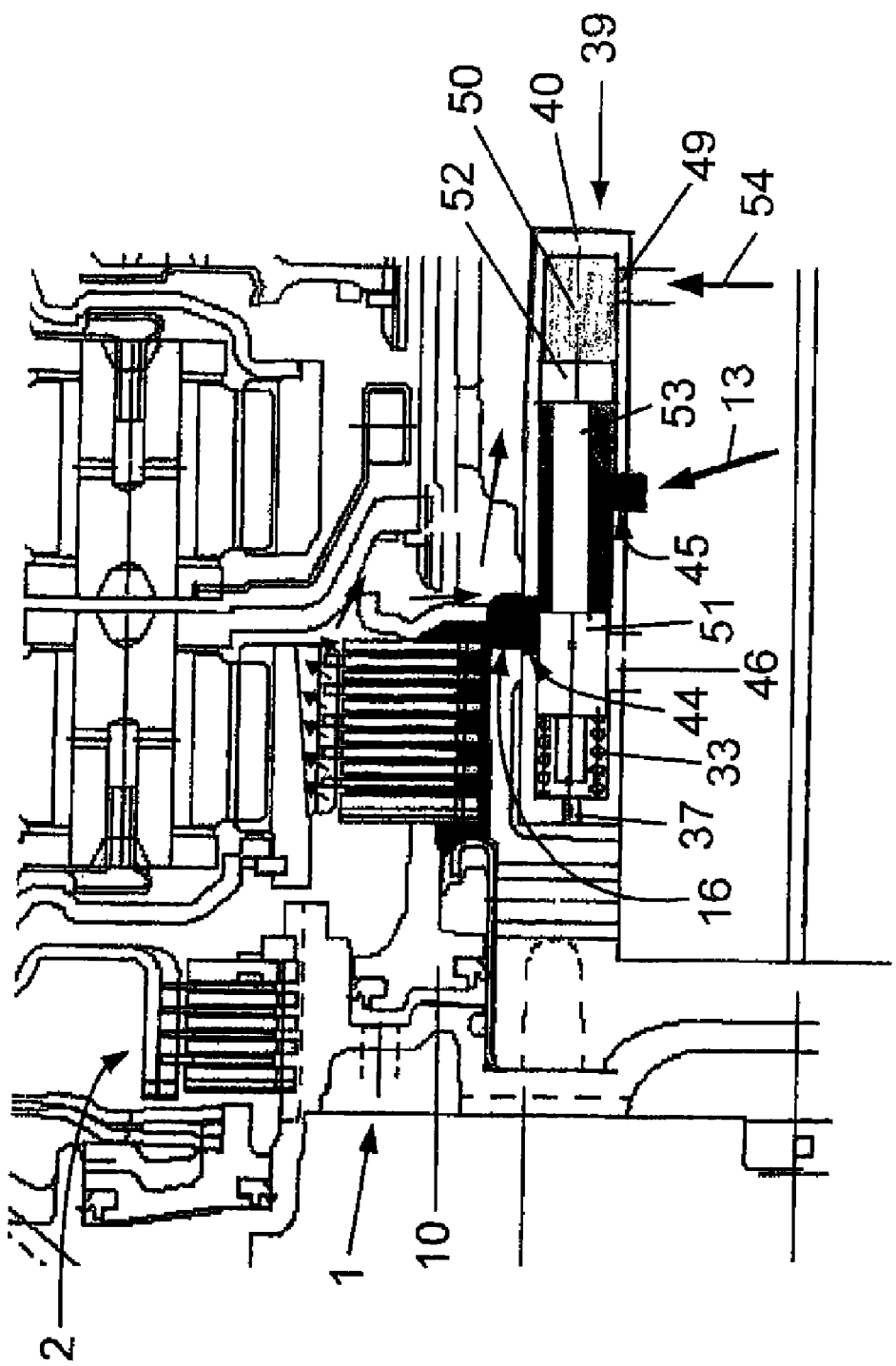
FIG. 8 is a disk brake in slipping operation or in the engaged condition, with cooling oil flowing radially from the outside inward and a switching valve as the cooling oil delivery means, which can be controlled by a separate control pressure for valve actuation.

In the embodiment of the multi-disk brake 1, shown in FIGS. 7 and 8, a valve housing 36 or 40 is formed as a separate valve housing or as an integral part of the transmission housing. In the case of the integral valve housing and transmission housing structure, the valve's axis is preferably orientated transversely to the main axis of the transmission, since this facilitates machining during the production of the transmission on a transfer line. If the valve housing 36 or 40 is made separately, an arrangement thereof parallel to the main axis of the transmission is preferred.

FIG. 7 also makes it clear that the valve housing 36 can have an axial vent hole 37 such that the spring space 47 in the switching valve 36 can be vented or pressurized during an axial displacement of the valve piston 32. The same purpose is served by a radially outward venting or pressurizing slot 38 in the valve housing 36. Alternatively, the outlet bore 46 in the switching valve housing 40 can be made axially sufficiently long to enable the pressurizing and venting of the spring space 47.

Furthermore, FIG. 7 shows that in the area of the side of the support disk 11, remote from the piston, an elastomer element 48 is fitted into an annular groove in a component fixed on the housing, such that the multi-disk brake can be sealed axially.

A switching valve 39 on the disk brake 1 (shown in FIG. 8) differs from the switching valve 43 in the previous Figures in that it is not actuated by the cooling oil 13 placed under a static pressure, but rather a separate switching valve control pressure 54 is used to actuate the valve. This control pressure 54 preferably depends directly or at least indirectly on the control pressure with which the piston 10 of the hydraulic brake disk actuator is controlled or actuated.

The switching valve 39 in the variation, illustrated in FIG. 8, is preferably part of an electro-hydraulic transmission control unit. In this example embodiment, it is arranged on one side on the radially inner side of the transmission control unit and, on the other side, it is in flow contact with the radially outward-facing side of the outer disk carrier 6. The valve housing 40 has a control pressure bore 49 to admit the control pressure medium 54 under control pressure, which thus passes into a control pressure space 50. In addition, the valve housing 40 has the inlet bore 45, the outlet bore 46 and the transfer bore 44 for the cooling oil 13. Furthermore, a first control piston 51 is arranged in the valve housing 40, which opens or closes the transfer bore 44, and a second control piston 52 that can be acted upon by the pressure of the control pressure medium 54. The two control pistons 51, 52 are connected axially to one another by a piston rod 53 and acted upon with an axial force by a spring 33.

When the control pressure is sufficiently high, the piston 52 and the piston 51 connected thereto are pushed to the left in FIG. 8 against the restoring force of the spring 33, so that the piston 51 uncovers the transfer bore 44 leading to the opening 16 in the outer disk carrier 6. The cooling oil 13 delivered under a static pressure can then pass from the inlet bore 45, via the switching valve 39, to the disk set 14 of the multi-disk brake 1 and flow through it radially from the outside inward.

As soon as the pressure of the control pressure medium 54 falls below a predetermined value, the spring 33 pushes the tandem piston 51, 52, 53 axially to the right in FIG. 8, closing the inlet bore 45 and opening the outlet bore 46 in the valve housing 40 of the switching valve 43. Then, when the multi-disk brake 1 is disengaged, cooling oil 13 can flow from the other, inner disk brake 2 and the two gearsets 17 and 18 radially from the inside outward through the disk set 14 and the switching valve 39 to the cooling oil sump. As already described in detail earlier, another cooling oil stream can pass by over the disk set 14 in the transmission housing radially from the inside outward to the cooling oil sump.

Figure 9:
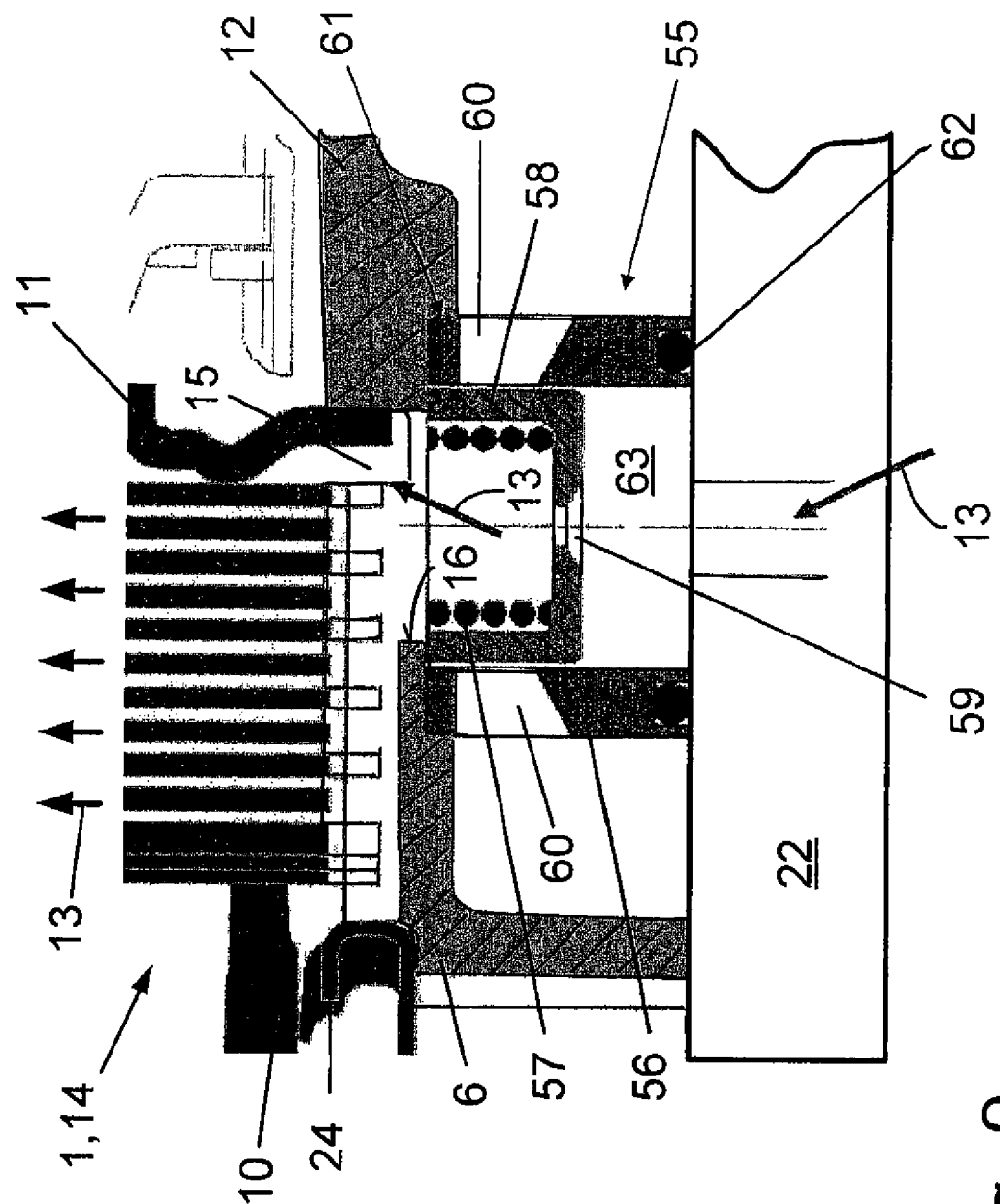
FIG. 9 is a longitudinal section through another hydraulic control valve, with which the cooling oil can be passed through the disk brake in two radially opposite directions.
Figure 10:
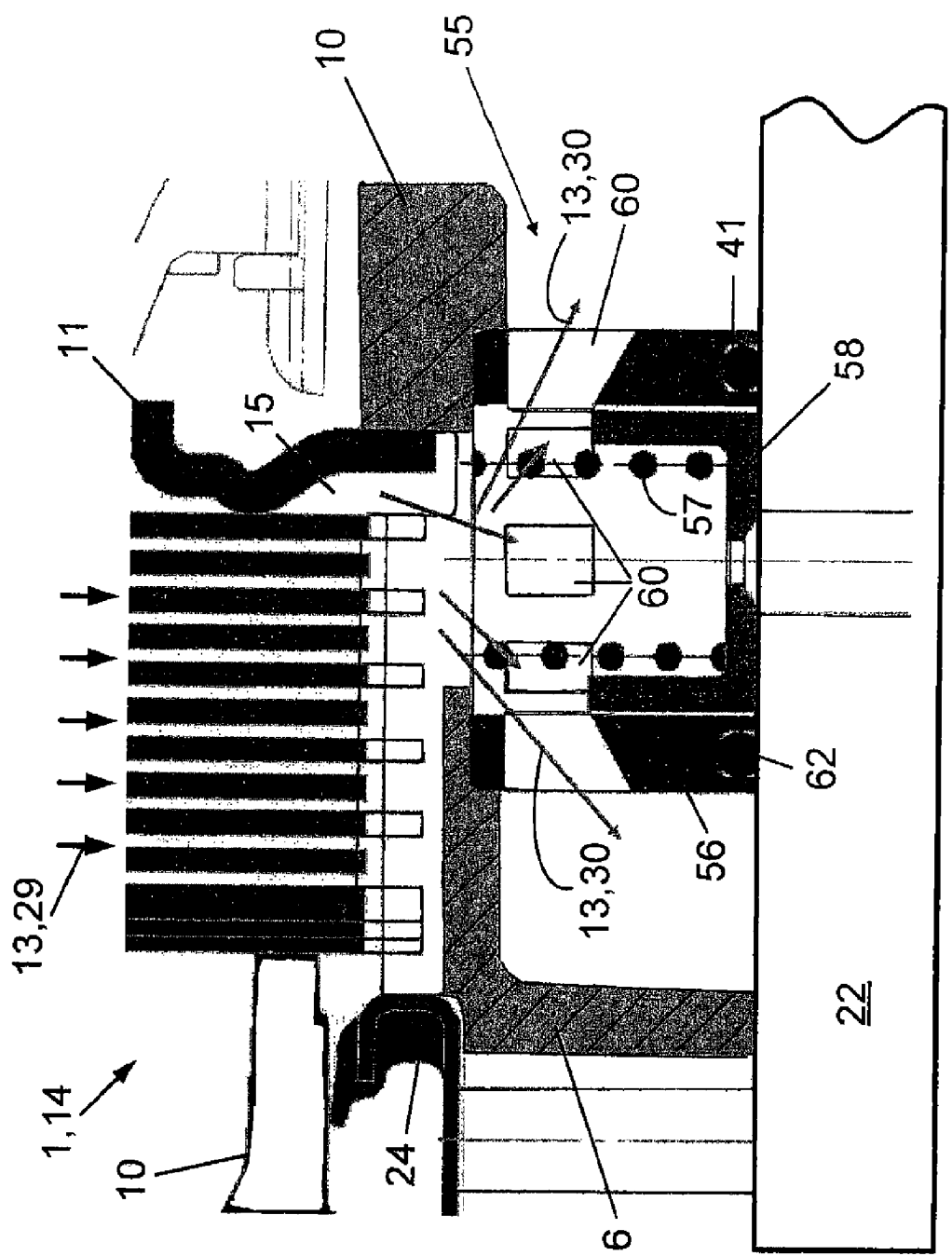
FIG. 10 is a hydraulic control valve of FIG. 9 in an operating situation in which cooling oil is passed radially from the inside outward.

FIGS. 9 and 10 show a multi-disk brake 1 with a hydraulic switching valve 55 according to a further embodiment. As already described in detail, this disk brake has inner and outer disks which, together with end and support disks 8, 11, form a disk set 14. The disk set 14 is largely sealed against any axial escape of cooling oil and can be acted upon by the piston 10 of the brake actuator (of which no more is shown) with an actuating force that closes the multi-disk brake 1.

As with the example embodiments of the invention explained earlier, in this multi-disk brake 1 too the cooling oil 13 flows through essentially radially from the inside outward or radially from the outside inward, depending on various operating situations of the brake. The oil flows through the disk brake radially from inside outward, i.e., in the direction from the center of the transmission toward its radial edge, when the disk brake is disengaged. When the disk brake is operated in a slipping mode or is engaged then, in contrast, the cooling oil passes through the disk set 14 radially from the outside inward.

To be able to carry out these cooling functions, the disk brake, according to FIGS. 9 and 10, has a hydraulic switching valve 55 with a hollow-cylindrical housing 56, which is fixed in a radial manner under the opening 16 in the outer disk carrier 6, to the latter or on the radially outer side of the transmission housing 12, in such a manner that the inner casing surface of the valve housing 56 extends and seals the opening 16.

In this connection, it is preferably provided that the hollow-cylindrical housing 56 of the hydraulic switching valve 55 is set at one of its axial ends in a radial recess 61 in the transmission housing 12, forming a seal, and with its other end arranged or fixed on the housing of the hydraulic transmission control unit 22.

In the hollow-cylindrical housing 56 of the hydraulic switching valve 55 is held a piston 58 which is pot-shaped in a longitudinal section and can move axially, with a bore 59 in the bottom of the piston through which cooling oil 13 can be passed. In addition, the pot-shaped piston 58 in inserted in the hollow-cylindrical housing 56 so that its piston bottom is positioned remotely from the inner disk carrier 6.

Preferably a spring 57, in this case a spiral compression spring, is inserted in the pot-shaped piston 58. This spring 57 rests at one end against the pot bottom of the piston 58 and, at the other end against the radially outer side of the outer disk carrier 6 or the transmission housing 12.

In the housing 56 are formed lateral openings 60, which can be opened or closed depending on the displacement position of the piston 58 so that the passage of cooling oil 13 is enabled or alternatively blocked.

For the further sealing of the cylinder space 63 formed in the hollow-cylindrical housing 56, a seal 62 is set into an annular groove 41 of the housing 56 at the end remote from the inner disk carrier, so that no cooling oil 13 can escape axially between the housing 56 of the hydraulic switching valve 55 and the housing of the hydraulic transmission control device 22. Furthermore, this seal 62, which can be made as an O-ring, can serve to compensate tolerances during the fitting of the hydraulic control valve 55 between the transmission housing 12 and the control unit 22.

Below, the operation of this hydraulic switching valve 55 is described.

FIG. 9 shows an operating situation in which the multi-disk brake 1 is in a slipping mode or is completely engaged. To cool or after-cool it sufficiently, cooling oil 13 is passed from the hydraulic control unit 22 to the hydraulic switching valve 55 radially from the outside inward. Thus, the cooling oil 13 first passes into the cylinder space 63. Since the cooling oil 13 is admitted under a static pressure, the pot-shaped piston 58 is pushed in the direction toward the disk set 14 against the restoring force of the spring 57. The piston 58 therefore closes off the lateral openings 60 in the hollow-cylindrical valve housing 56.

From the cylinder space 63, the cooling oil 13 passes through the bore 59 in the bottom of the piston 58 and into its cylindrical hollow space. From there, the cooling oil 13 flows under pressure into the annular space 15 in the area of the support disk 11, through which the cooling oil 13, as was already described earlier, passes to the disks of the disk set 14.

After the cooling oil 13 has passed through the disk set 14, it passes via adjacent areas of the transmission to the already mentioned oil sump.

FIG. 10 illustrates the operating situation in which the multi-disk brake 1 is open and there is a speed difference between the rotating and the fixed disk brake components. In this operating situation, cooling oil 13 should be passed in a cooling oil stream 29 radially from the inside outward through the disk set 14. This is made possible by the fact that when the multi-disk brake 1 is disengaged, no cooling oil 13 passes to the hydraulic switching valve 55 under static pressure radially from the outside inward. Accordingly, the—in this case pot-shaped—piston 58 in the valve housing 56 is held in its undisturbed, rest position by the force of the spring 57. The lateral openings 60 in the valve housing 56 are therefore left clear so that cooling oil 13 coming from the brake disks through which it has flowed can pass in cooling oil streams 30 first into the valve housing 56 and then, through the lateral openings 60, in the direction toward the oil sump.

Figure 11:
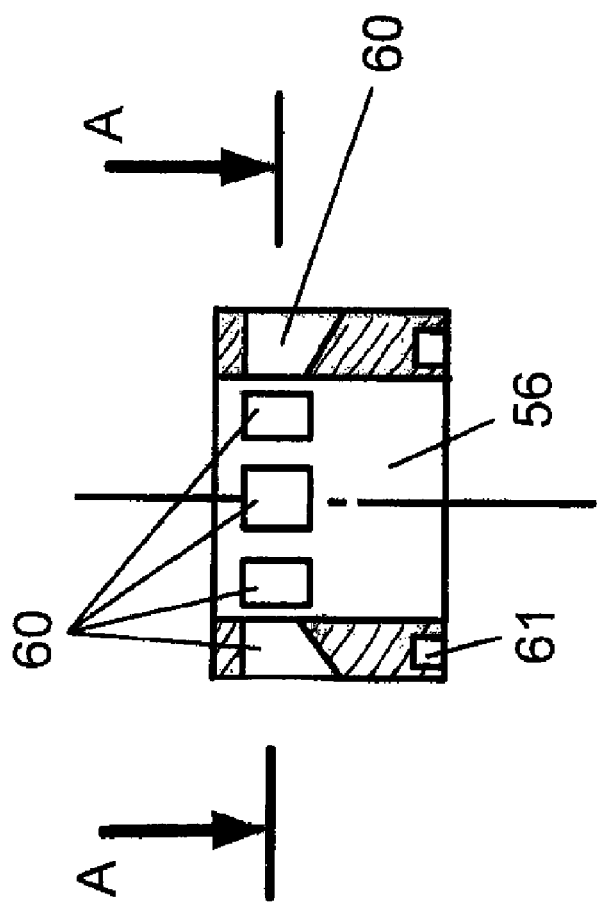
FIG. 11 is a detailed longitudinal section through the cylinder housing of the hydraulic control valve of FIGS. 9 and 10.
Figure 12:
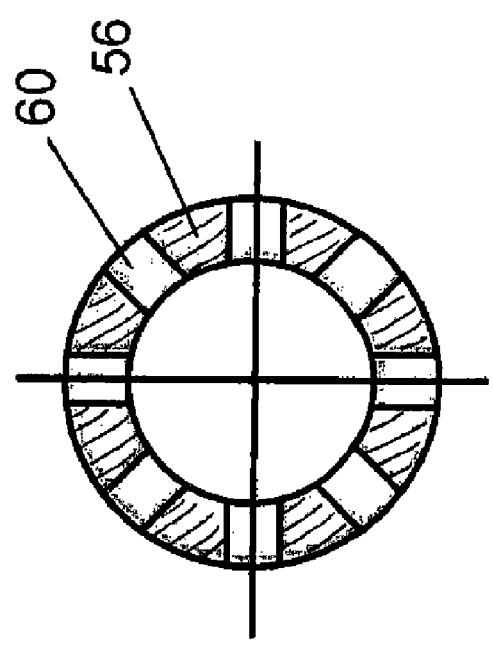
FIG. 12 is a cross-section through the cylinder housing, along the section plane M in FIG. 11.

For the further explanation of a preferred structure of the hollow-cylindrical valve housing 56, FIG. 11 shows a detailed longitudinal section thereof and FIG. 12 shows a cross-section in the section plane M of the valve housing 56, according to FIG. 11. It can be seen clearly that the lateral openings 60 are distributed around the circumference of the valve housing 56 so that to avoid drag torque losses when the disk brake 1 is disengaged, cooling oil 13 can flow easily and quickly away from their area.

Since the multi-disk brake described with the forced cooling according to the invention, is still very efficient when engaged or in slip operation, besides the applications described earlier the system can also be used for cooling a pure starting brake. It is then not necessary to have in the transmission a further starting element such as a hydrodynamical torque converter.

Finally, let it be mentioned that a multi-disk brake, according to the invention, can also be used as a shift element in a hybrid transmission.

REFERENCE NUMERALS 1 multi-disk brake
2 multi-disk brake (conventional)
3 inner disks
4 inner disk carrier
5 outer disks
6 outer disk carrier
7 friction lining
8 end disk close to the piston
9 end disk remote from the piston
10 piston
11 support disk
12 transmission housing
13 cooling oil
14 disk set
15 annular space in the support disk
16 opening in the outer disk carrier
17 first gearset
18 second gearset
19 oil supply means; radially displaceable supply tube, valve/delivery tube
20 seal on the tube 19
21 adjustment device for the tube 19/arrow
22 hydraulic control device
23 carrier teeth
24 seal on the piston or the end disk on the piston side
25 seal on the support disk
26 cooling oil flow toward the sump
27 tooth gap in the teeth of the outer disk carrier
28 oil guide facing radially inward/short arrows
29 oil flow from the gear sets and the inner disk brake 2
30 oil flow toward the sump
31 valve housing
32 piston of the control slide valve
33 spring of the control slide valve
34 return space on the side of the support disk remote from the piston
35 cooling oil flow to the sump
36 separate valve housing
37 axial vent bore
38 vent slot
39 switching valve (actuated by a control pressure)
40 valve housing
41 annular groove at the end in the housing 56
42 radial openings in the inner disk carrier
43 switching valve
44 transfer bore in the switching valve
45 inlet bore
46 outlet bore in the switching valve
47 spring space in the switching valve
48 elastomer element, seal
49 control pressure bore in the valve housing 40
50 control pressure space
51 control piston
52 control piston
53 piston rod
54 control pressure medium
55 hydraulic switching valve
56 housing
57 spring
58 piston
59 bore in the piston 58
60 openings in the housing
61 radial recess in the transmission housing
62 seal element, O-ring
63 cylinder space

The invention claimed is:

1. A multi-disk brake (1) in an automatic transmission, the disk brake (1) comprising an inner disk carrier (4) with inner disks (3) and an outer disk carrier (6) with outer disks (5), the inner disks (3) and the outer disks (5) are axially alternately arranged on the inner and the outer disk carriers (4, 6), at least one of the inner disks (3) and the outer disk (5) have friction linings (7), a pressure actuated piston (10) of a piston-cylinder acting on the inner disks (3) and the outer disks (5) to apply a force and engage the multi-disk brake (1), one of an end disk (9) or a support disk (11) remote from the piston (10) forms an axial abutment for a disk set (14), which is formed by the inner disks (3), the outer disks (5), the end disk (9) and the support disk (11), at least one of the multi-disk brake (1) and adjacent components are designed to wet the disk set (14) with cooling oil;

when the multi-disk brake (1) is disengaged, the cooling oil (13) flows from radially inside the multi-disk brake (1) through the multi-disk brake (1) and then radially outwardly through at least one radial opening (16) in the outer disk carrier (6);

when the multi-disk brake (1) is one of engaged or partially engaged, the cooling oil (13) flows from radially outside the multi-disk brake (1) through the at least one radial opening (16) in the outer disk carrier (6) and then radially inwardly through the multi-disk brake (1); and the multi-disk brake (1) is sealed in an axial direction to prevent leakage of the cooling oil.

2. The multi-disk brake according to claim 1, wherein the radial opening (16) in the outer disk carrier (6) opens into at least one annular space (15) at an axial end of the disk set (14) remote from the piston (10) between the end disk (9) and the support disk (11).

3. The multi-disk brake according to claim 1, wherein the multi-disk brake (1) is axially sealed by separate sealing means (24) on at least one of the piston (10), an end disk (8) on the piston side, one of an inner disk (3) or an outer disk (5) nearest the piston, the end disk (9) remote from the piston and the support disk (11) remote from the piston.

4. The multi-disk brake according to claim 1, wherein the multi-disk brake (1) is axially sealed by metallic sealing surfaces formed on at least one of the piston (10), an end disk (8) on the piston side, one of an inner disk (3) or an outer disk (5) nearest the piston, the end disk (9) remote from the piston and the support disk (11) remote from the piston.

5. The multi-disk brake according to claim 1, wherein the cooling oil (13) is passed through at least partially radial grooves in the friction lining (7) of at least one of a respective inner disk (3) and a respective outer disk (5), through which the cooling oil (13) flows from a radial inflow end to a radial outflow end of the inner and the outer disks (3, 5) of the disk set (14).

6. The multi-disk brake according to claim 1, wherein the inner disk carrier (4) has radial openings (42) for inflow and outflow of cooling oil (13) into and out of the disk set (14), and carrier teeth (23) on the outer disk carrier (6) have tooth gap sections (27) in a carrier profile for enabling the cooling oil (13) to pass through from an annular space (15) to the inner and the outer disks (3, 5).

7. The multi-disk brake according to claim 1, wherein when the multi-disk brake (1) is at least one of engaged and partially engaged, the cooling oil (13) is directed under static pressure through separate oil supply means (19).

8. The multi-disk brake according to claim 7, wherein the oil supply means (19) is biased into communication with the opening (16) to form an annular seal around the opening (16) to direct the cooling oil to a radially outer end of the opening (16) in the outer disk carrier (6) and the oil supply means (19) is withdrawn from the outer disk carrier (6) after an end of a mode of operation to clearing the opening (16).

9. The multi-disk brake according to claim 7, wherein the oil supply means comprises a radially displaceable delivery tube (19), which is radially displaced by one of a static cooling oil pressure or a control pressure that one of engages or partially engages the multi-disk brake (1), one of the delivery tube (19) has a seal (20) at an end radially toward the outer disk carrier (6) or a radially outer side of the outer disk carrier (6) has a seal surrounding the opening (16).

10. The multi-disk brake according to claim 7, wherein the oil supply means (19) comprises a hydraulic switching valve (39, 43, 55).

11. The multi-disk brake according to claim 10, wherein the switching valve (43) has a housing (31, 36, 40) in which a piston (32) loaded by a spring (33) is arranged to move axially, and in which the piston (32) one of opens and closes a transfer bore (44) which is in flow communication with the opening (16) in the outer disk carrier (6),
the housing (31, 36, 40) of the switching valve (43) has an inlet bore (45) through which the cooling oil (13) flows under pressure,
the housing (31, 36, 40) of the switching valve (43) has an outlet bore (46) through which the cooling oil (13) flows out of the housing (31, 36), and
the housing (36) of the switching valve (43) is one of integral with the transmission housing (12), integral with a housing of a hydraulic control unit (22) or is a separate housing.

12. The multi-disk brake according to claim 11, wherein the switching valve (43) has a control valve, each of which are aligned in the transmission on an axis that is one of parallel to a main axis of the transmission, transverse to the main transmission axis, or obliquely to the main transmission axis.

13. The multi-disk brake according to claim 10, wherein a separate control pressure actuates the switching valve (39).

14. The multi-disk brake according to claim 13, wherein the switching valve (39) is actuated by a control pressure such that the piston (10) of the multi-disk brake (1) is also actuated.

15. The multi-disk brake according to claim 13, wherein the switching valve (39) comprises a valve housing (40) with a control pressure bore (49) for delivery of control pressure medium (54), a control pressure space (50), an inlet bore (45), an outlet bore (46) and a transfer bore (44) for the cooling oil (13), and a first control piston (51) that opens and closes the transfer bore (44) and a second control piston (52) that is acted upon by the control pressure medium (54), the first and the second control pistons (51, 52) are axially connected to by a piston rod (53) and are acted upon by an axial force of a spring (33).

16. The multi-disk brake according to claim 10, wherein the switching valve (55) has a hollow-cylindrical housing (56) which is fixed radially under the opening (16) in the outer disk carrier (6) in such a manner that an inside casing surface of the housing (56) covers the opening (16), a piston (58) with a bottom bore (59) is held and moves axially in the housing (56), and lateral openings (60) are formed in the housing (56) which, is opened or closed by the piston (58) depending on a position of the piston (58).

17. The multi-disk brake according to claim 16, wherein an axial end of the housing (56) of the hydraulic switching valve (55) is set into a radial recess (61) in the transmission housing (12), and an opposed axial end is arranged on a housing of a hydraulic transmission control unit (22) of the transmission, and
a seal (62) to seal a cylinder space (63) is arranged between the housing (56) of the hydraulic switching valve (55) and the housing of the hydraulic transmission control unit (22).

18. The multi-disk brake according to claim 16, wherein the hydraulic switching valve (55) is configured in such a manner that when the cooling oil (13) is passed into the cylinder space (63) radially from the outside inward, the piston (58) is moved in an engaging direction toward the outer disk carrier (6) in the housing (56), and when the cooling oil (13) is passed radially from the inside outward, the piston (58) is moved in an opposite direction to open the lateral openings (60) in the housing (56).

19. The multi-disk brake according to claim 18, wherein movement of the piston (58) that opens the lateral openings (60) in the housing (56) is brought about by at least one of admitting cooling oil (13) into the piston (58) radially from the inside outward and a restoring force of a spring (57), which rests at one end against the piston (58) and at an other end against one of a radially outer side of the outer disk carrier (6) or the transmission housing (12).

20. The multi-disk brake according to claim 18, wherein movement of the piston (58) which engages the lateral openings (60) in the housing (56) is brought about by admitting cooling oil (13) radially from the outside inward into a cylinder space (63) of the housing (56) under a bottom of the piston (58).

21. A method for operating a multi-disk brake (1) comprising an inner disk carrier (4) with inner disks (3) and an outer disk carrier (6) with outer disks (5), the inner disks (3) and the outer disks (5) are axially alternately arranged on the inner and the outer disk carriers (4, 6), at least one of the inner disks (3) and the outer disk (5) have friction linings (7), a pressure actuated piston (10) of a piston-cylinder communicates with the inner disks (3) and the outer disks (5) to apply a force and engage the multi-disk brake (1), one of an end disk (9) or a support disk (11) remote from the piston (10) forms an axial abutment for the disk set (14), which is formed by the inner disks (3), the outer disks (5), the end disk (9) and the support disk (11), at least one of the multi-disk brake (1) and adjacent components are designed to wet the disk set (14) with cooling oil; when the multi-disk brake (1) is disengaged, the cooling oil (13) flows from radially inside the multi-disk brake (1) through the multi-disk brake (1) and then radially outwardly through at least one radial opening (16) in the outer disk carrier (6), when the multi-disk brake (1) is one of engaged or partially engaged, the cooling oil (13) flows from radially outside the multi-disk brake (1) through the at least one radial opening (16) in the outer disk carrier (6) and then radially inwardly through the multi-disk brake (1), and the multi-disk brake (1) is sealed in an axial direction to prevent leakage of the cooling oil, the method comprising the steps of:

directing cooling oil (13) through and over the disk set (14) in radially different directions depending on an operating condition of the multi-disk brake (1), determining the flow direction of the cooling oil (13) through and over the disk set (14) by depending on actuation of an oil delivery means (19, 39, 43), directing the flow of the cooling oil radially from the outside inward when the multi-disk brake (1) is engaged or partially engaged, directing the flow of the cooling oil radially from the inside outward when the multi-disk brake (1) is disengaged, and actuating the oil delivery means (39, 43) by a hydraulic pressure which is produced in a hydraulic control device (22) independent of the actuation pressure for the piston (10) of the multi-disk brake (1).

22. The method according to claim 21, further comprising the step of actuating the oil delivery means (19, 39, 43) by a hydraulic pressure difference.

23. The method according to claim 21, further comprising the step of actuating the oil delivery means (19, 39) by a pressure difference produced in the stream of cooling oil (13).

24. The method according to claim 21, further comprising the step of actuating the oil delivery means (19, 39, 43) by a hydraulic pressure which also actuates the piston (10) of the brake actuator.

* * * * *